Jan. 13, 1970   H. G. JOHNSON   3,489,209
HEAT EXCHANGER HAVING PLASTIC AND METAL COMPONENTS
Filed Dec. 23, 1968   3 Sheets-Sheet 1

INVENTOR.
HERBERT G. JOHNSON

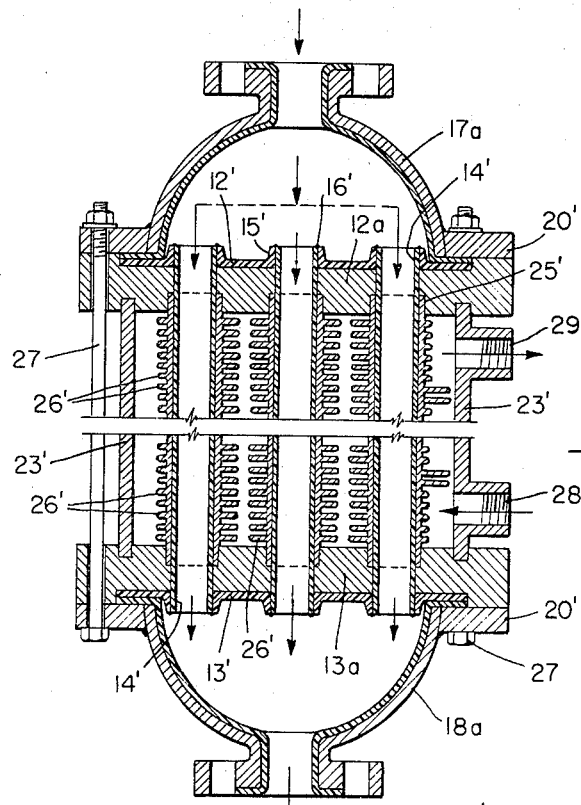
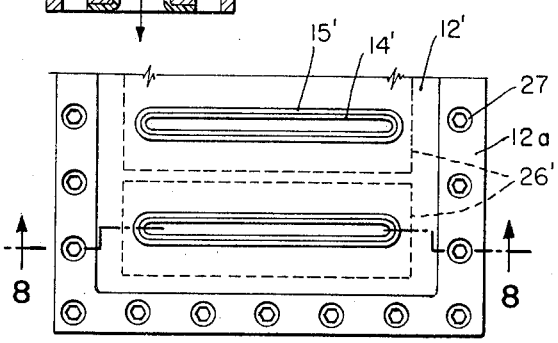
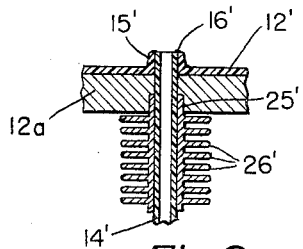
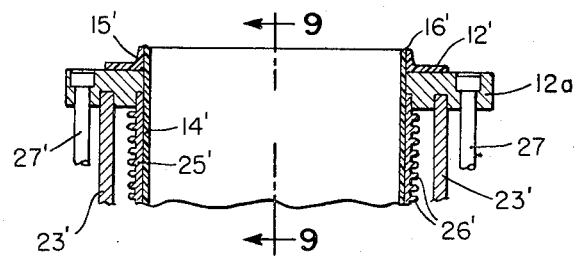
INVENTOR.
HERBERT G. JOHNSON

United States Patent Office 3,489,209
Patented Jan. 13, 1970

---

3,489,209
HEAT EXCHANGER HAVING PLASTIC AND METAL COMPONENTS
Herbert G. Johnson, 17 N. Drexel Ave.,
Havertown, Pa. 19083
Continuation-in-part of application Ser. No. 559,672, May 18, 1966. This application Dec. 23, 1968, Ser. No. 785,979
Int. Cl. F28f *13/18, 19/02;* F28d *1/00*
U.S. Cl. 165—133         14 Claims

ABSTRACT OF THE DISCLOSURE

This application discloses a heat exchanger in which corrosion-resistant plastic components are used for surfaces which are exposed to corrosive fluids and in which metal components are used for rapid thermal transfer from the plastic components to a thermal disposal or secondary fluid, the construction being uniquely arranged to utilize the greater corrosion resistance and easier workability of the plastic components and the higher thermal conductivity and greater strength of the metal components. Preferably the plastic components are metal-coated or "metallized" on the outer surface for better thermal transfer to the metal components.

---

BACKGROUND OF THE INVENTION

This application is a continuation-in-part of my application S.N. 559,672, filed May 18, 1966, now Patent No. 3,426,841, granted Feb. 11, 1969.

In that application there is disclosed a form of heat exchanger which comprises cold-work-strengthenable plastic tubes and other plastic components which provide the corrosion-resistant surfaces for corrosive fluids. In that application construction the thermal transfer from the plastic tubes to the thermal disposal fluid is provided by sheets (in most cases of plastic material) which have sleeves fitted on the tubes. Most forms disclosed in that application were intended for use with a liquid disposal fluid. More extensive transfer surface is needed if a gaseous thermal disposal fluid, like air, is used. Previously, so far as known, there had been very few proposals for using plastic tubes in heat exchangers and none which employed cold-work-strengthened tubes which could be made of much thinner wall thickness and larger commercial diameters, as desirable.

SUMMARY OF INVENTION

The present invention provides an improved construction in which the corrosion-resistant surface which is exposed to the harmful or primary fluid is provided by thin-walled plastic tubes and other plastic components, preferably of cold-work-strengthened plastic material and tubes of relatively large diameter and in which metal backing sheath means with extensive contact with the tubes provides improved thermal transfer to the thermal disposal or secondary fluid. The metal sheathing means permits even thinner plastic tubes with more efficient heat exchange to be used.

The tube ends are connected to plastic tube sheets by fused joints and the heat exchange surfaces of the tubes are engaged by metallic elements which provide rapid thermal transfer from the tubes to other metal thermal transfer elements which, in turn, provide more extensive thermal transfer surface area to a thermal disposal fluid, such as air. The construction is especially suitable for use as air-cooled radiators for cooling a corrosive liquid coolant, as for automobile radiators. Herein heating as well as cooling is embraced by the term "thermal transfer."

DRAWINGS

The objects, advantages, and features of novelty of the invention will be apparent from the following description of certain exemplary embodiments thereof, reference being made to the accompanying drawings, wherein:

FIG. 6 is an axial section of a modified form having a fully enclosed chamber for a thermal disposal fluid;

FIG. 7 is a top plan view of another modification;

FIG. 8 is a partial section taken on the line 8—8 of FIG. 7;

FIG. 9 is a section taken on the line 9—9 of FIG. 8;

SPECIFIC DESCRIPTION

Figure 1:
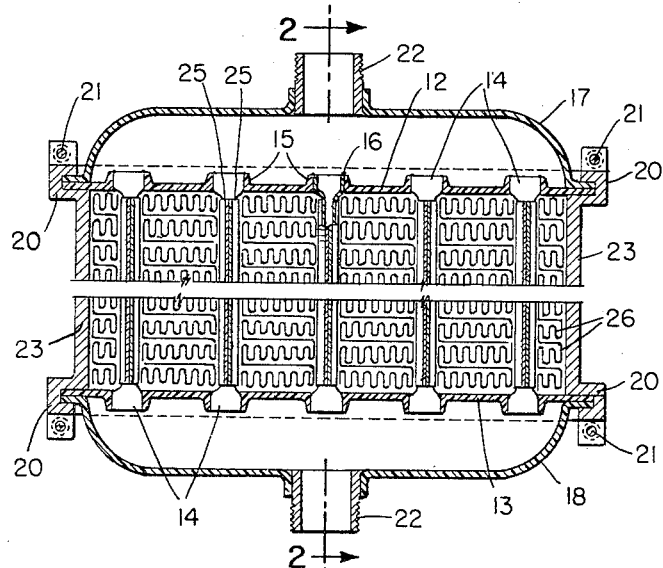
FIG. 1 is a transverse (to thermal disposal fluid flow direction) section of a thermal transfer construction or radiator embodying the present invention, the section being taken on the line 1—1 of FIG. 2.

Referring to FIGS. 1–5, there is shown a form of heat exchanger which is principally adapted for use with a gaseous thermal disposal or secondary fluid, such as air, and adapted for uses such as for an automobile radiator.

There are plastic tube sheets 12, 13 to which thin-walled plastic tubes 14 are secured in sealed relationship, as by providing exteriorly protruding sleeves 15 on the tube sheets and fusing the ends of the tubes to the sleeves, as at 16.

Corrosion resistant headers 17, 18, preferably of plastic like the tubes as shown, are sealingly disposed over the tube sheets 12, 13, the seals preferably being made by fusing together the outer edges of the headers and tube sheets. The connected edges are strengthened by rim members 20 having grooves which embrace the edges, the rim members being secured together, as by bolts or screws 21, shown in FIG. 3. The headers are provided with pipe connections 22 to install with a fluid pipe line.

It is not always necessary that the headers 17, 18 be made of plastic material and be fused to the tube sheets; they may be made of corrosion resistant metal, such as stainless steel, and be sealed to the tube sheets in other ways, as by gaskets and clamping means.

Figure 2:
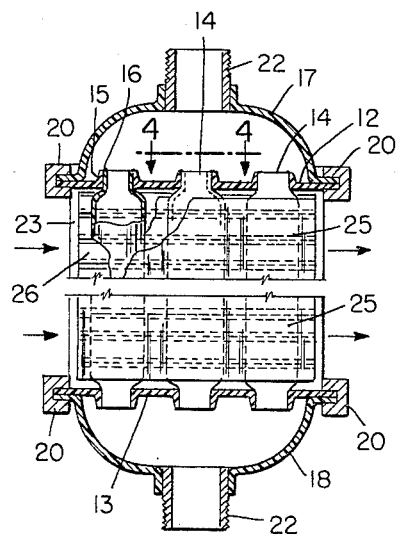
FIG. 2 is a longitudinal (along thermal disposal fluid flow direction) section taken on the line 2—2 of FIG. 1.
Figure 3:
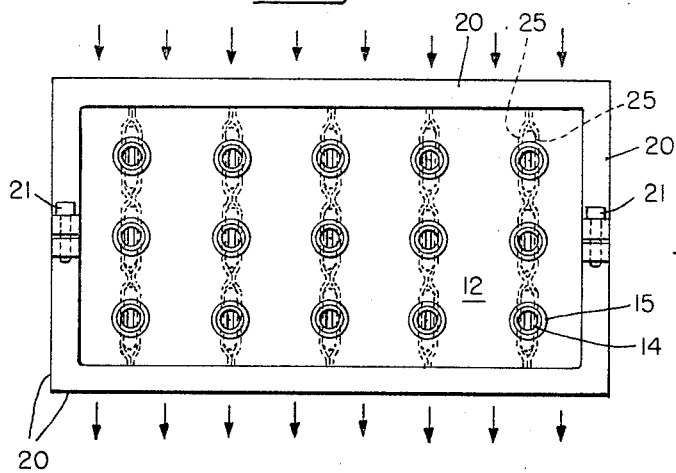
FIG. 3 is a top plan view with the header removed.

The thermal disposal fluid here has free flow through the assembly, as indicated by the arrows in FIGS. 2 and 3, and the flow is confined on the sides, as by frame plates 23 disposed between the rim members 20 and connected thereto, as by welding or equivalent means, if desired.

The thin plastic tubes 14 are backed and strengthened and made more efficiently thermal conductive by sheathing means 25 of a strong highly conductive material, such as metal. For convenience of assembly the sheathing means may be plates which are pressed against the sides of the tubes, as by thin springy corrugated heat-exchange fin-like elements 26 which are confined between the casing or frame plates 23. The plates 25 may be flat but preferably, as shown, are bent in around the sides of the tubes to strengthen them there and increase the thermal exchange surface area.

Desirably, the outer surfaces of the plastic tubes 14 are metallized, in known manner, and provided with soldering coating so as to be more effective for thermal transfer and to be further effective by brazing to the sheathing means, as by heating the whole assembly, in known manner.

The plastic tubes 14 are shown to be circular in section at their ends (FIGS. 4 and 5) for easy fit and connection with the end sleeves 15 of the tube sheets and to be flattened (FIG. 4) for greater exposed area on the sides which engage the sheathing plates 25. If desired, the flattened (i.e., the non-circular) portion of the tubes may be maintained throughout their full length, including their ends, the sleeves of the tube sheets being shaped to fit. Or the tubes may be circular throughout their full length, with the sheathing means being altered to fit or even being made as tight fitting tubes for either circular or non-circular shape.

Figure 4:
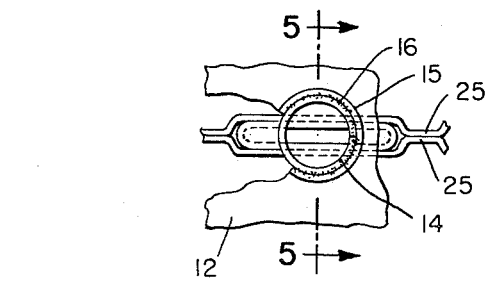
FIG. 4 is an enlarged plan view of a tube and tube sheet connection region, taken on the line 4—4 of FIG. 2.
Figure 5:
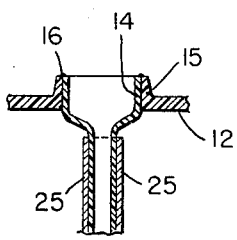
FIG. 5 is a section taken on the line 5—5 of FIG. 4.

In the construction shown in FIGS. 4 and 5 it is assumed that the pressures are such that the plastic tubes are sufficiently strong to withstand them without rupture, the construction being intended primarily for obtaining increased thermal transfer. Here the sheathing means is shown to stop short of the tube sheets. This shortening is due mainly to the presence of the transition portion, from circular to non-circular of the plastic tubes. If the plastic tubes are made of uniform cross-section throughout their full length the sheathing means, preferably, will extend over the entire unsupported portion of the plastic tubes—here between the two spaced-apart tube sheets.

The embodiment shown in FIG. 6 is essentially like that of FIGS. 1–5 except that it is made to withstand greater fluid pressures and to have a fully enclosed chamber for the thermal disposal fluid. Insofar as applicable the same reference characters, with a prime (') added, are used as in the first embodiment.

There are plastic tube sheets 12', 13' having outwardly projecting sleeves 15' fused at 16' to the ends of plastic tubes 14'. In this embodiment the tubes are shown to be circular in section.

The plastic tube sheets 12', 13' are backed and strengthened by apertured tube sheet backing plates 12a, 13a having counterbores which receive the ends of the metal sheath tubes 25' which surround the plastic tubes 14'.

The plastic headers 17', 18' are backed and strengthened, as by metal headers 17a, 18a, having flanged line connection elements 22'.

The rim members 20' extend entirely around the assembly, as does the frame casing component 23', and the casing parts are secured together, as by tie rods 27, to form a chamber casing with fluid connections 28, 29.

The sheath tubes 25' are provided with fin-like elements 26' which are integral or fused, brazed or welded on.

The embodiment shown in FIGS. 7, 8 and 9 is like that shown in FIG. 6 except that the tubes and sheaths are flattened and elongated in the direction of fluid flow. The same reference characters as are used in FIG. 6 are used here since the only change is in the shape of certain parts.

Figure 10:
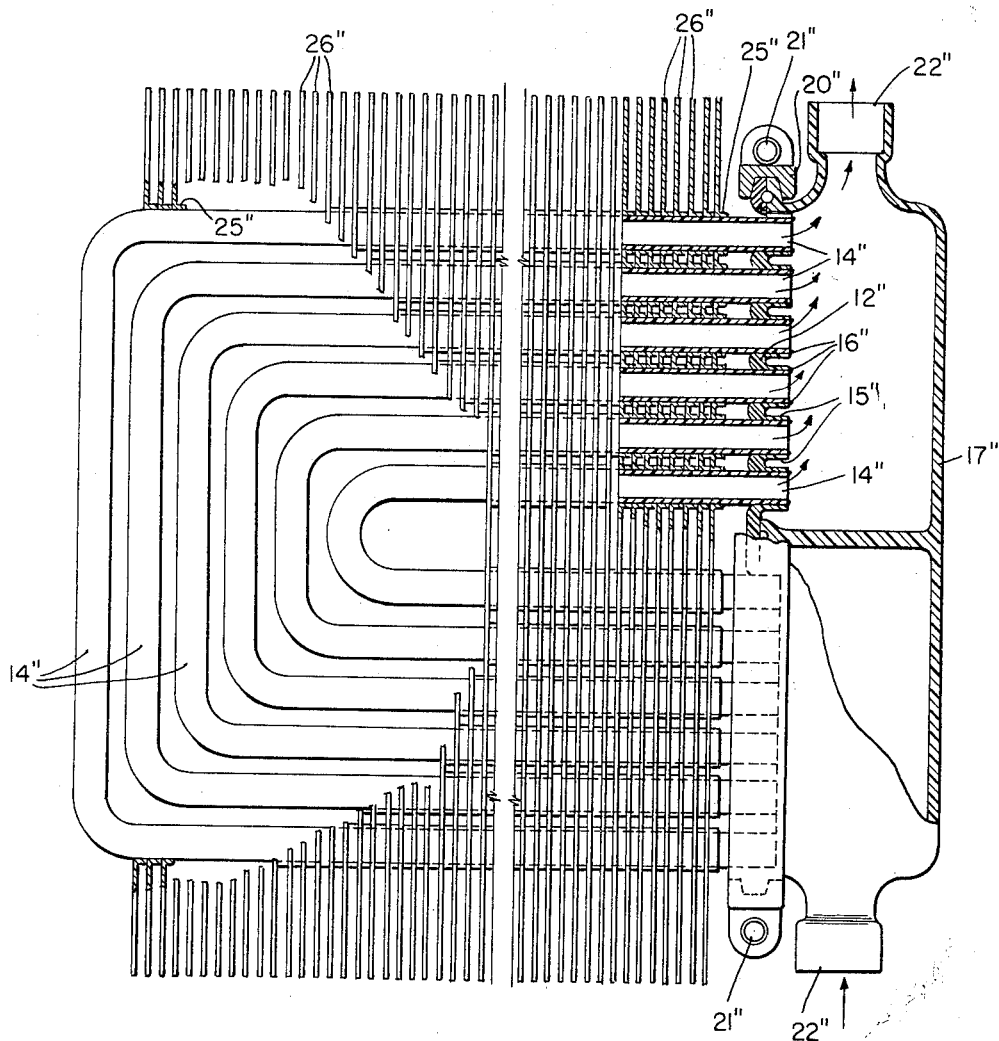
FIG. 10 is an elevation, partly in section, of another modification.

The embodiment shown in FIG. 10 is that of the copending application mentioned above. The same reference characters are used, with a double prime (") so far as applicable. Here a single plastic tube sheet 12" is provided with sleeves 15" to which the ends of U-shaped plastic tubes 14" are fused at 16". A plastic header 17" is secured to the tube sheet, as by rim members 20" clamped together by bolts 21". The plastic edges may be fused together. The header has pipe connections 22". The flanges 25" of the fin-like metal elements 26" provide substantially continuous sheathing means for the plastic tubes except at the outer bow portions and, if desired, these bow portions could be backed, as by metal tubing, if added tube strength should be needed for higher pressures.

In all forms the plastic tubes extend through the tube sheet openings and sleeves and are fused at their ends to the ends of the sleeves. Since the fused connections are disposed within the header space the fluid pressures existing inside and outside the tube-sleeve joint zones are always equal or balanced and there is no tendency for the fused joint connections to be ruptured by fluid pressure. Further, since the sleeves and tubes are formed of relatively flexible plastic material, the tube sheets can flex to provide for change in length or bending of the tubes with change in temperature. Bending can be further accommodated by making the tube sheet holes of oversize diameter and the sleeves somewhat tapered or conical interiorly.

Various plastics, such as synthetic polymers and even rubber-type non-metal materials, can be used by providing the more highly-heat-conductive and stronger sheathing support as provided by the present invention.

It is preferable to use polymer plastics which have the greatest resistance to the most extensive range of corrosive materials (this including radioactive materials of atomic energy work). The presently known materials having the greatest resistance to corrosive substances are the fluorocarbon polymers, the most effective being polytetrafluoroethylene, PTFE, commonly referred to as "Teflon." This and other suitable plastics are greatly strengthened by solid-state or "cold" working so as to have very thin walls of very considerable strength which permits them to be used in heat exchangers in spite of the fact that their coefficient of thermal conductivity may be low.

An advantage of the present invention is found in the use of "cold-worked" tubes to greatly increase their pressure carrying capability over ordinary plastic tubes of the corresponding or same chemical formulation with concurrent great reduction in wall thickness so as to decrease their resistance to heat flow through the tube wall.

The advantages of biaxial orientation of the fibers of thin films or sheets of certain plastics, such as polyamides (including nylons), fluorocarbon polymers, polyesters, polystyrenes, polyolefins, polypropylenes, and the like have been applied for certain uses. By balanced and controlled stretch in axial and transverse directions the physical properties are very greatly enhanced. In the case of PTFE, orientation can increase the tensile strength to several times that of the unoriented film or sheet. A polypropylene strip, for example, can by fiber orientation have its longitudinal strength increased to ten times that of the unoriented extruded film or tube.

Biaxially oriented plastic tubing is a relatively new development and by the present structure and method of assembly, particularly for securely connecting the ends of the tubes to the tube sheets, its superior physicals are utilized to advantage in heat exchange equipment.

Even the less expensive non-axially (circumferentially) oriented plastic provides a decided improvement over non-oriented tubing heretofore used, although on the basis of improved strength alone the improvement would be limited to approximately doubling the permissible working pressure or halving the wall thickness for any given pressure due to the physical law that hoop stress under a given internal pressure is double the axial stress.

Actually, the structure is improved, even with unoriented tubing, because of the permanent and conformable stress relieving and connections hereby provided for the ends of the tubes with the sleeves of the tube sheets.

Suitable balanced biaxial orientation will optimize the directional strengthening of the plastic molecular structure to give maximum increase in internal-pressure stress-carrying ability of the tubing. This is about five times that of normal unoriented tubing—in the case of polypropylene, an increase from about 5000 p.s.i. to about 25,000 p.s.i. in tensile strength.

And for a given strength, this would permit the practical use of tubing with a wall only one-fifth as thick, that is, in the case of known proposals, a tube having a wall thickness of only 2% of the tube diameter instead of 10% of tube diameter for unoriented plastic. This would result in saving 80% of the tube material and in reducing the thermal resistance across the tube wall to one-fifth its former resistance. Or, the number of tubes could be reduced to one-fifth so long as the tube wall resistance is controlling as to the flow of heat.

As another possibility, by strengthening the tube material by orientation it is possible to use tubes five times the previous diameter without reduction in pressure, temperature or thickness; and this does not require an increase in heat transfer either. In other words, it is possible to use tubes of any practical diameter up to the largest in present common use, i.e., 1⅜″ or 1375 mils, and still retain the advantages of using plastic. This opens up entirely new fields to the heat exchange designer.

A special feature of the present invention is in the ability to dip the ends of the tube and tube-sheet sleeve assembly and make all the connections simultaneously or at one shot. Reference to dipping includes hot plate, induction heaters, welding torches and the like.

Another feature is that the forming operations are such that the plastic memory or creep reversion to original shape is utilized to further the aims sought by the invention. For example, during fusing of the tubes to the sleeves the tendency of the sleeves will be to shrink in diameter and tighten on the tubes, the tubes being assumed to be supported, as by internal mandrels, thus creating ideal conditions for thermal-pressure welding or fusing over the entire heated (immersed, it may be) length. The same practice of fusing parts together, in principle, may be employed in securing the shell flange to the tube sheet, or in securing the fluid conducting pipes to the pipe connections.

The tube sheets are easily formed by solid-extrusion operations to form the elongated sleeves without drilling out material to form holes except perhaps small center holes. These sleeves may be of a length many times the thickness of the tube sheet and are solid-formed and stabilized for heat shrinkage on the tubes at the fuse or weld zone of the integrated joints. They are flexible to accommodate tube bending and at the ends are reduced to approximately the wall thickness of the tubes to make fused joints of the maximum efficiency. The headers can also be biaxially oriented and strengthened by solid-state formation.

Prior to the invention disclosed in my application referred to above there had been no satisfactory commercial use of tubes of strong, large-size, thin-walled plastic material for heat exchangers, so far as known. There have been proposals to use extremely small plastic tubes for heat exchangers but of material in the natural extruded state of very low rupture strength, which kept the diameter necessarily so small and the wall relatively so thick that constructions were very limited in capacity and efficiency. By the ability to use large tubes, by the effective plastic-to-plastic connections, and by the plastic supporting sheath construction provided by the present invention, it is possible to have very efficient thermal exchange between primary and secondary fluids and to deal with high fluid pressures while utilizing the very superior corrosion resistant characteristics of plastic materials.

While certain embodiments of the invention have been disclosed for purposes of illustration, it is to be understood that there may be various embodiments and modifications within the general scope of the invention.

I claim:

1. A heat exchanger, comprising in combination, a plastic tube sheet having tube receiving holes, a plurality of plastic tubes having their ends disposed in said tube sheet holes and fused therein, means for supplying an internal thermal exchange fluid to and removing it from said tubes, and metallic sheathing means of high thermal conductivity material secured in thermal transfer relationship with the outer surfaces of said tubes in a heat exchange zone at one side of said tube sheet, said sheathing means having an extensive thermal transfer surface area exposed for contact by an external thermal exchange fluid in said heat exchange zone.

2. A heat exchanger as set forth in claim 1, wherein the outer surfaces of said plastic tubes are provided with a metallized coating on surfaces engaging said sheathing means.

3. A heat exchanger as set forth in claim 2, wherein said sheathing means and the outer metallized surface coating of said plastic tubes are fused together.

4. A heat exchanger as set forth in claim 1, wherein said plastic tubes in the heat exchange zone are provided with extended non-circular portions engaging said sheathing means.

5. A heat exchanger as set forth in claim 4, wherein said plastic tubes are flattened in the non-circular portions along the direction of flow of external thermal heat exchange fluid.

6. A heat exchanger as set forth in claim 1, wherein said plastic tube sheet at the holes is provided with integral plastic sleeves extending away from the body of the plastic tubes and said sheathing means in the heat exchange zone, said sleeves embracing the ends of said plastic tubes and fused thereto.

7. A heat exchanger as set forth in claim 1, wherein the tube sheet and tubes are composed of a solid-state-work-strengthened plastic material heat-shrunk and fused together at their ends.

8. A heat exchanger as set forth in claim 7, wherein the tube sheet and tubes are composed of a polymer fluorocarbon.

9. A heat exchanger as set forth in claim 8, wherein the tube sheet and tubes are composed of polytetrafluoroethylene.

10. A heat exchanger as set forth in claim 1, wherein said sheathing means comprises metal tubes in contact fit on said plastic tubes.

11. A heat exchanger as set forth in claim 10, wherein said metal tubes at their ends at the tube sheet are connected to the tube sheet to fully enclose the plastic tubes on the sheathed portions at the tube sheet.

12. A heat exchanger as set forth in claim 11, which further includes a metal tube sheet backing said plastic tube sheet interiorly on the sheathed tube side in the heat exchange zone and in the flow of the external thermal exchange fluid and having holes embracing the plastic tubes with counterbores embracing the ends of the metal tubes.

13. A heat exchanger as set forth in claim 1, wherein the plastic tubes are disposed between and secured to spaced tube sheets and wherein said sheathing means covers substantially the full length of the plastic tubes between the spaced tube sheets.

14. A heat exchanger as set forth in claim 1, which further includes a plastic header having its edges fused to the outer edge of said plastic tube sheet, a metal tube sheet reinforcing member disposed within said plastic tube sheet location on the heat exchange zone side and having holes embracing said plastic tubes and a metal header reinforcing member disposed exteriorly of and backing said plastic header, said tube sheathing means comprising metal tubes enclosing said plastic tubes and fused to metallized surfaces on said plastic tubes, said tube sheet reinforcing member having counterbores embracing the ends of said metal tubes, said plastic tube sheet, plastic tubes, and plastic header comprising cold-work-strengthened polymer plastic material, and said plastic tube sheet having integral outwardly extending sleeves embracing and fused to the ends of said plastic tubes.

(References on following page)

References Cited

UNITED STATES PATENTS

| | | | |
|---|---|---|---|
| 3,001,766 | 9/1961 | Laist | 165—133 X |
| 3,170,227 | 2/1965 | Richmond et al. | 165—133 X |
| 3,228,456 | 1/1966 | Brown et al. | 165—1 |
| 3,231,012 | 1/1966 | Morris. | |
| 3,308,879 | 3/1967 | Maddocks | 165—167 |
| 3,315,740 | 4/1967 | Withers | 165—172 |
| 3,332,479 | 7/1967 | Martin | 165—178 X |

ROBERT A. O'LEARY, Primary Examiner

THEOPHIL W. STREULE, Assistant Examiner

U.S. Cl. X.R.

165—148